United States Patent [19]

Horiuchi

[11] Patent Number: 4,802,747
[45] Date of Patent: Feb. 7, 1989

[54] COMPACT ZOOM LENS
[75] Inventor: Akihisa Horiuchi, Tokyo, Japan
[73] Assignee: Canon Kabushiki Kaisha, Tokyo, Japan
[21] Appl. No.: 100,307
[22] Filed: Sep. 23, 1987
[30] Foreign Application Priority Data
Sep. 25, 1986 [JP] Japan ................................. 61-26539
Sep. 25, 1986 [JP] Japan ................................. 61-226540
[51] Int. Cl.$^4$ .......................... G02B 15/14; G02B 9/64
[52] U.S. Cl. .................................................. 350/427
[58] Field of Search ............................... 350/427, 423

[56] References Cited
U.S. PATENT DOCUMENTS
3,848,967 11/1974 Grey ................................. 350/423
4,256,381 3/1981 Kreitzer ............................. 350/423

Primary Examiner—John K. Corbin
Assistant Examiner—Rebecca D. Gass
Attorney, Agent, or Firm—Fitzpatrick, Cella, Harper & Scinto

[57] ABSTRACT

A compact zoom lens comprising, from front to rear, a first lens unit of positive power for focusing, a second lens unit of negative power monotonously movable for zooming, a third lens unit held stationary during zooming, and a fourth lens unit of positive power to move in a locus convex toward the front to maintain the constant position of an image plane which shifts as the image magnification varies, a fixed stop for determining F-numbers being located between the second and third lens units.

2 Claims, 7 Drawing Sheets

COMPACT ZOOM LENS

BACKGROUND OF THE INVENTION

1. Field of the Invention

This invention relates to compact zoom lenses, and more particularly to zoom lenses in which the provision of compensating for the image shift is made in the rearmost lens unit and the stop is arranged in so appropriate a position as to achieve a minimization of the size of the entire lens system, so that the optical performance is improved to suit photographic cameras or video cameras.

2. Description of the Related Art

Figure 1:
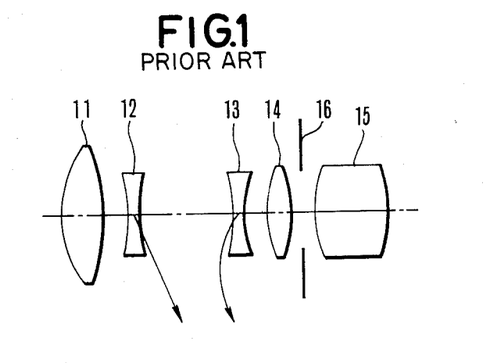
FIG. 1 is a schematic view of the conventional type of zoom lens.

The typical zoom lens that has been used in the photographic cameras or video cameras is of the type shown in FIG. 1, comprising a first lens unit 11 of positive refractive power for focusing, a second lens unit 12 of negative refractive power axially movable in one direction mainly for varying the image magnification, a third lens unit 13 of negative refractive power axially movable in a convex path toward the front for compensating for the image shift, a fixed fourth lens unit 14 of positive refractive power which is put in use as necessity arises to make almost afocal the light beam passed through the first to third lens units and a fixed fifth lens unit 15 of positive refractive power for forming an image of an object on a focal plane. The stop 16 is, in many cases, located between the third and fourth units or between the fourth and fifth units.

The zoom lens of FIG. 1 has its zooming provision made in the second and third lens units, and its stop positioned far away from the first lens unit or close to the fifth lens unit. For these reasons, to admit of the effective off-axis pencil of rays at a certain level over the focusing and zooming ranges, a large diameter is given to the first lens unit. Hence there was a tendency to make the entire lens system bulky and heavy. In such a lens system, when focusing, for the first lens unit is moved, a large driving power is required. For example, the auto-focus apparatus when to be applied thereto necessitated a motor of much larger torque. Another problem was that the consumption of electrical energy, too, comes to increase.

The consequence was that, in view of the recent trend of unifying the video camera with the video tape recorder, such a photographic lens was not very suited to the new video camera, since it called for a large reduction of the proportion of the photographic system.

In addition to its compact form and light weight, the photographic lens in the video camera is required to be of the zoom type with a high optical performance. Yet another requirement is that the space between the rear vertex of the lens and the image pickup tube or CCD device is long enough to accommodate the protection glass plate, the stripe filter for color separation, the low pass filter and others, in other words, the back focal length is sufficiently long.

Since the various factors as such should be taken into account in designing a photographic lens for the new video camera, for all the requirements are fulfilled, it becomes difficult to preserve the optical performance at an excellent level. This is reflected to a decrease of the contrast of image.

There is a technique of allowing the fixed stop to be located between the second and third lens units disclosed in U.S. patent application Ser. Nos. 931,537 filed Nov. 14, 1986 and 063,434 filed June 18, 1987 both assigned to the assignee of the present invention. In this connection, however, it should be pointed out that, in both cases, the direction of movement of the zoom unit is different from that for the invention.

SUMMARY OF THE INVENTION

A first object of the present invention is to provide a compact zoom lens of reduced weight over the entire lens system suited to the video camera or photographic camera.

A second object is to provide a zoom lens of improved compact form while still preserving the optical performance at excellence.

Other objects of the invention will become apparent from the following description with reference to the drawings.

BRIEF DESCRIPTION OF THE DRAWINGS

In these graphs, the figures with the suffixes (A), (B) and (C) attached to the numbers of the figures show aberrations in the wide angle end, the intermediate position, and the telephoto end respectively. In FIG. 2, the arrows represent the directions of movement of the zoom units. ΔS denotes the sagittal image surface, ΔM the meridional image surface, and I, II, III and IV the first, second, third and fourth lens units respectively.

DETAILED DESCRIPTION OF THE PREFERRED EMBODIMENTS

Figure 2:
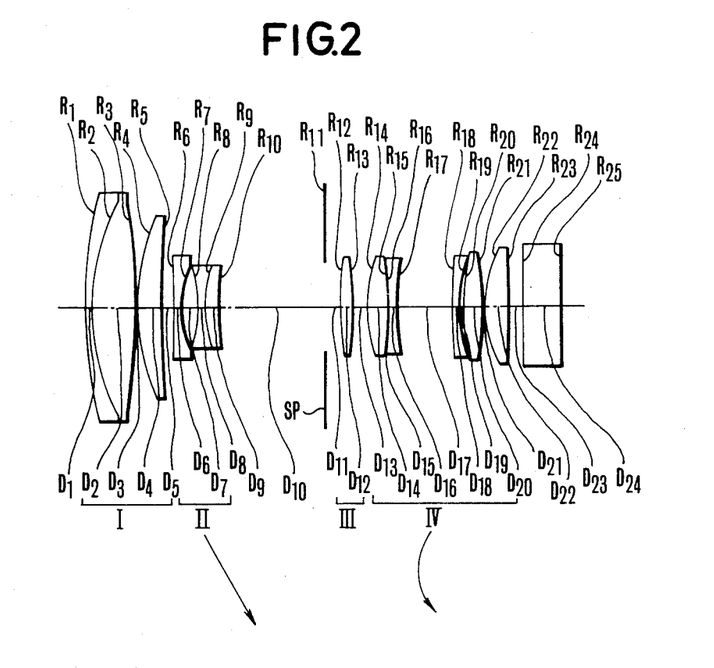
FIG. 2 is a longitudinal section view of a zoom lens according to the present invention.
Figure 3A:
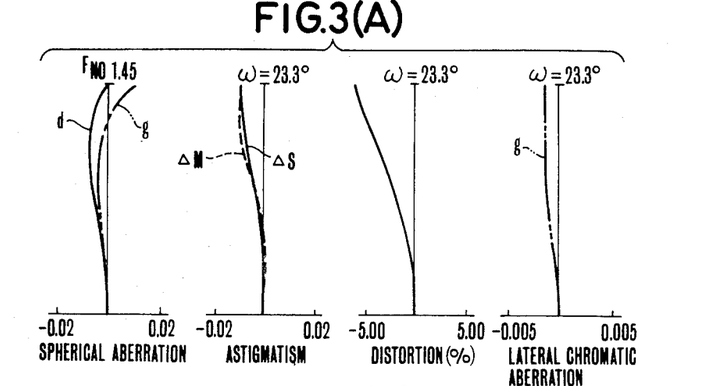
FIGS. 3(A)–3(C), 4(A)–4(C), 5(A)–5(C), 6(A)–6(C), 7(A)–7(C) and 8(A)–8(C) are graphic representations of the aberrations of numerical examples 1 to 6 of the invention.
Figure 3B:
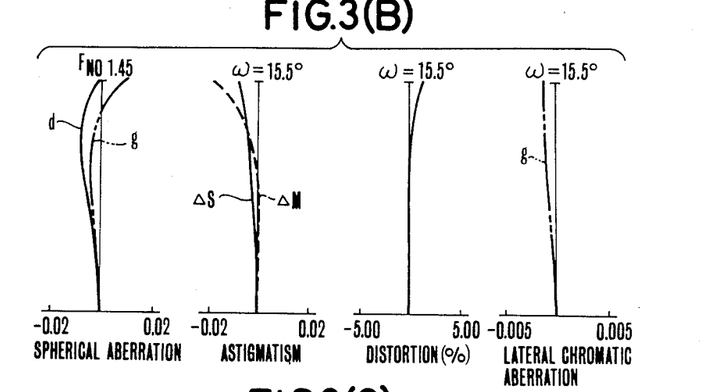
Figure 3C:
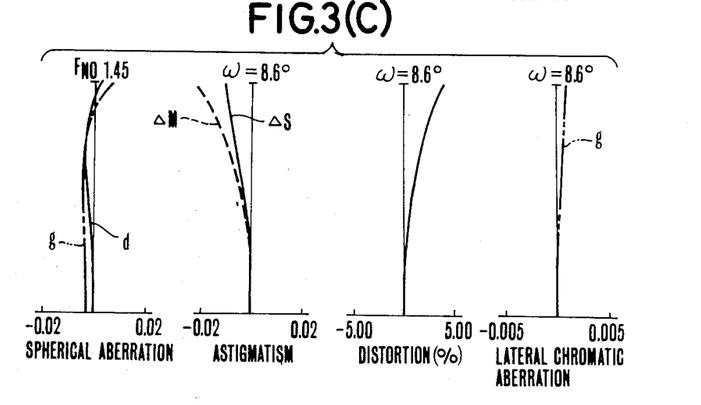
Figure 4A:
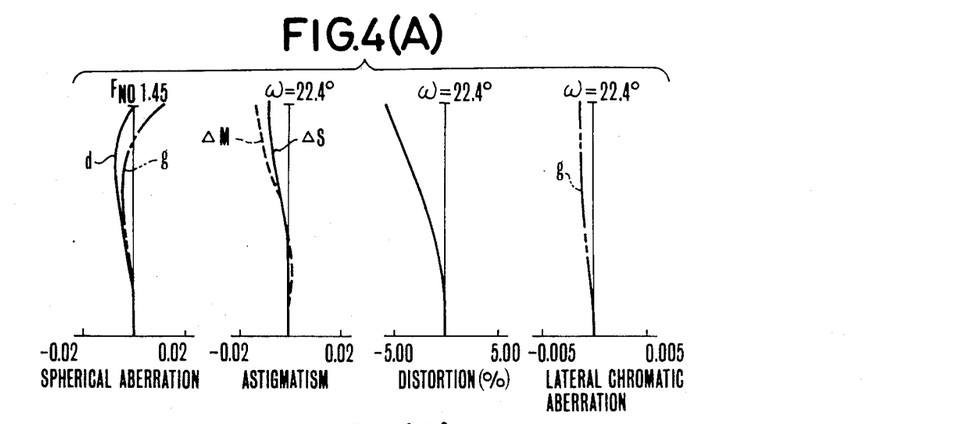
Figure 4B:
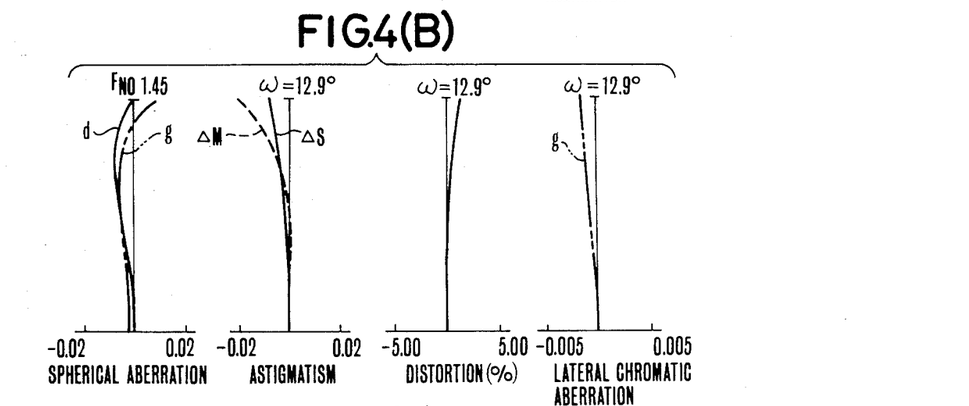
Figure 4C:
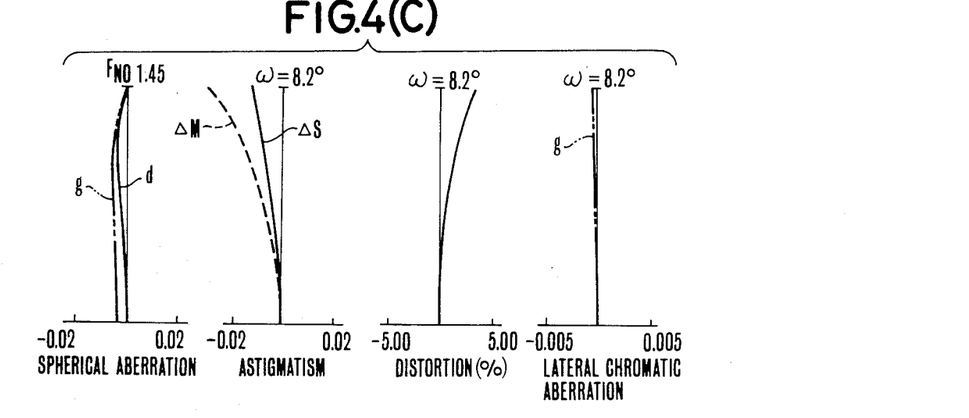
Figure 5A:
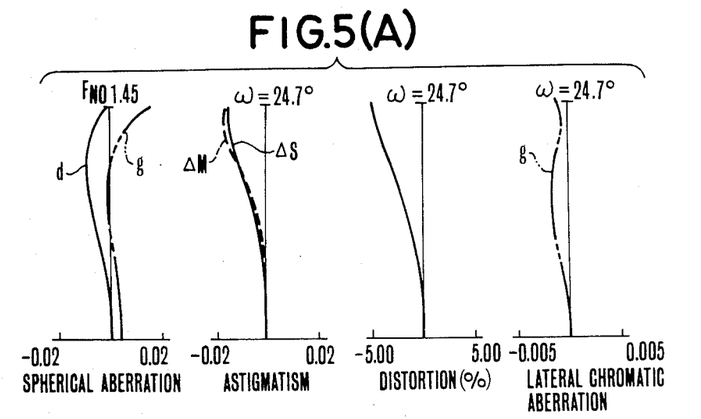
Figure 5B:
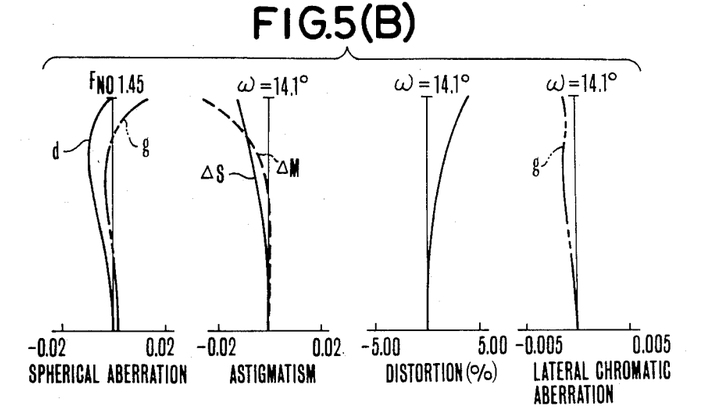
Figure 5C:
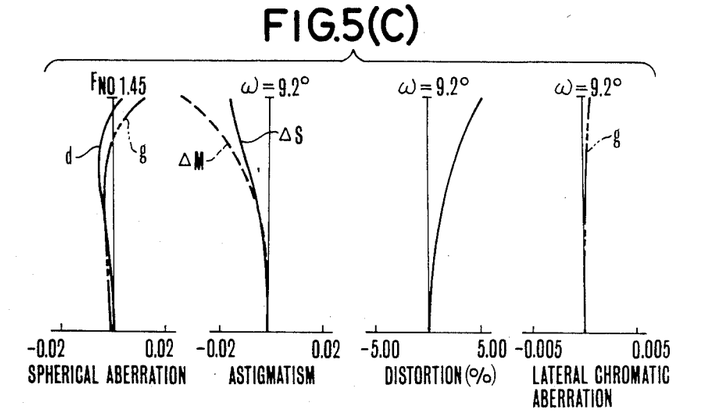
Figure 6A:
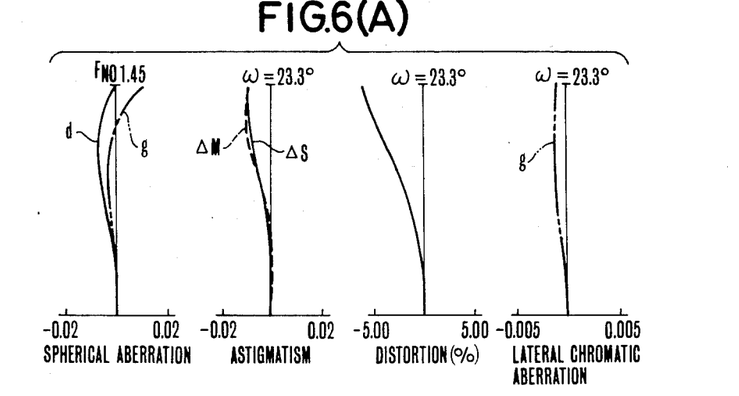
Figure 6B:
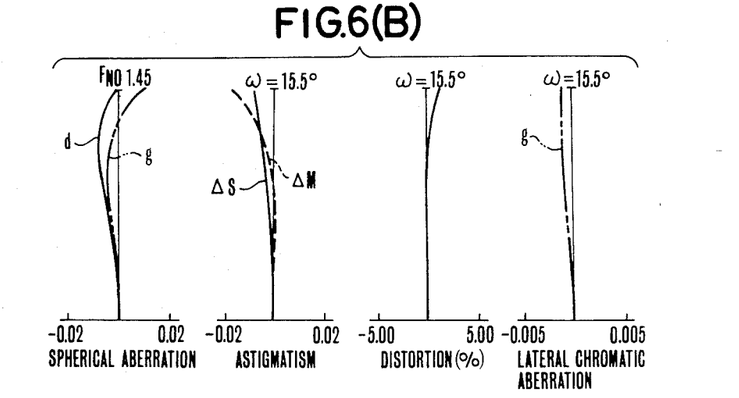
Figure 6C:
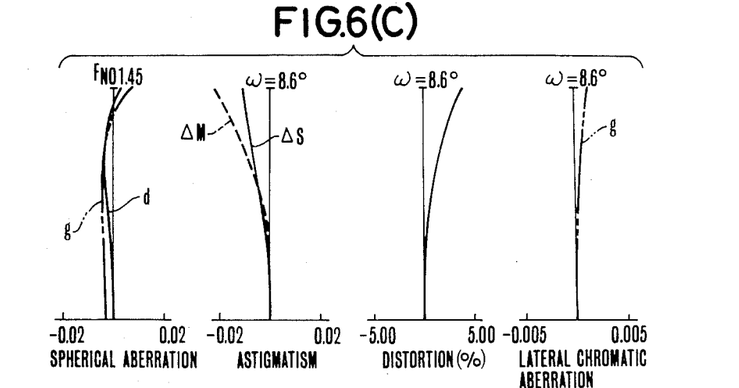
Figure 7A:
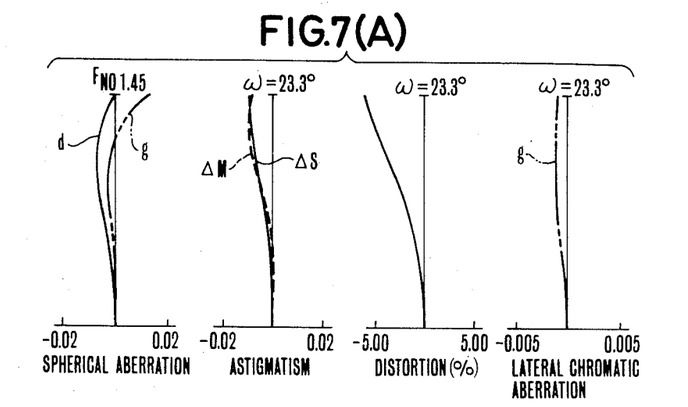
Figure 7B:
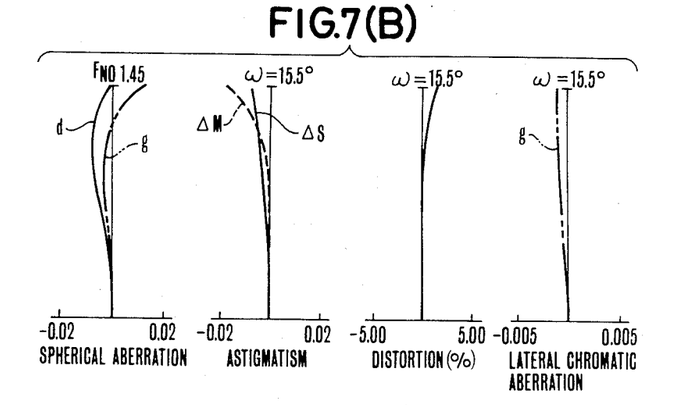
Figure 7C:
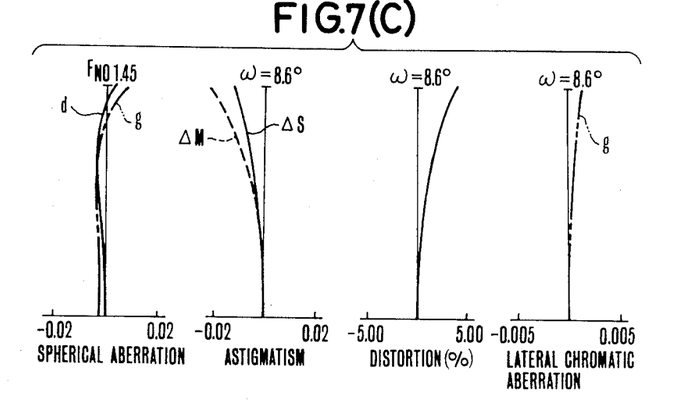
Figure 8A:
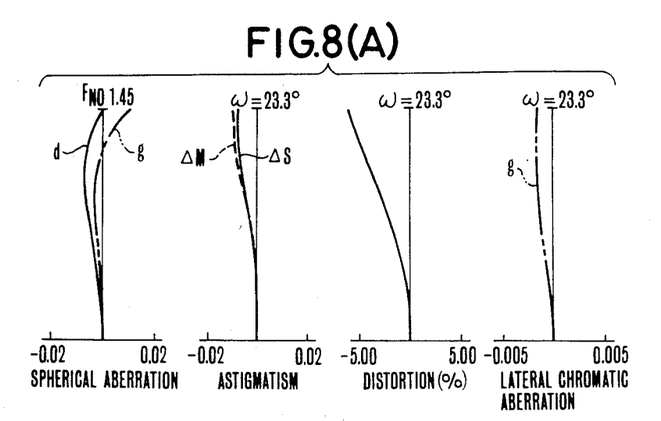
Figure 8B:
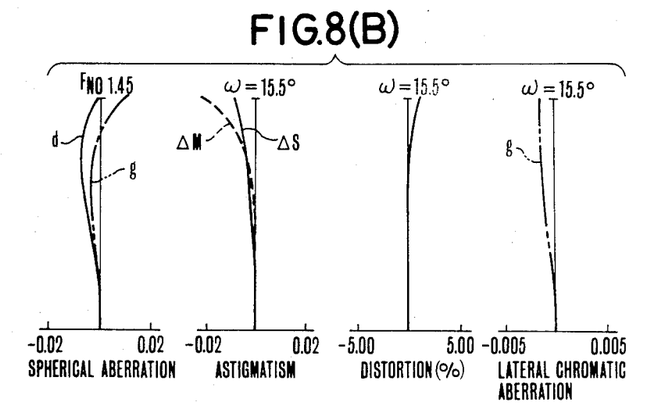
Figure 8C:
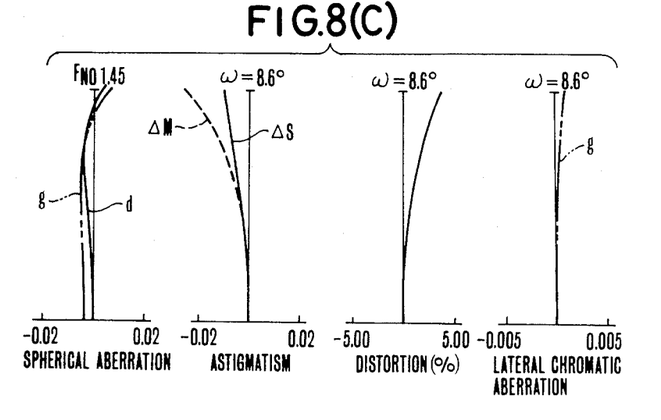

In FIG. 2 there is shown a zoom lens according to the invention comprising, from front to rear, a first lens unit I of positive refractive power for focusing, a second lens unit II of negative refractive power to move monotonously toward the image side when varying the image magnification, a third lens unit III of positive refractive power held stationary during variation of the image magnification, and a fourth lens unit IV of positive refractive power to move on an optical axis while depicting a convex locus toward the front to maintain constant the position of an image plane which shifts as the image magnification varies (that is, as zooming from one end to the other, once advanced to the front, it moves to the rear). A fixed stop SP for determining F-numbers is located between the second and third lens units II and III.

In the embodiment of the invention, by bringing the stop SP frontward up to the location between the second and third lens units II and III, in other words, almost the center of the physical length of the optical system, a valuable reduction of the diameter of the front members of the first lens unit I is achieved, thus contributing to a compact form of the whole lens system.

In most of the general zoom lenses, the weight of the first lens unit amounts to 50 to 80 percent of the total. For this reason, in order to reduce the weight of the zoom lens, it becomes effective either to reduce the specific gravity of the material of the lenses of the first lens unit or to reduce the volume of the first lens unit by decreasing the diameter of the front lens members. Of these, to choose a material of small specific gravity is difficult because the degree of freedom on the optical design decreases. Therefore, to achieve a reduction of the weight of the lens system in such a manner that the optical performance is maintained excellent, it becomes advantageous at decreasing the diameter of the first lens unit. For example, if the lens is considered to change all its dimensions proportionally, then its volume is proportional to the cube of the diameter. Hence, if the lens diameter can be decreased 10%, the volume can be reduced to $(0.9)^3$ or by about 27%. In the embodiment of the invention, priority is given to a shortening of the diameter particularly of the first lens unit. By this, the reduction of the weight of the entire lens system is achieved. That is, the shortening of the diameter of the front members of the first lens unit I is achieved by arranging the stop SP in an almost intermediate position of the optical system between the second and third lens units II and III which is far closer to the first lens unit I than in the prior known zoom lens whose stop is arranged behind the fourth lens unit as shown in FIG. 1.

Also, in the embodiment of the invention, the refractive power of the third lens unit III is made positive and the refractive power of each lens unit is so determined that the on-axis light beam is caused to enter as either an almost parallel beam or a converging light beam at the fourth lens unit IV. Thus, the effective diameter of the fourth lens unit IV is minimized.

The above-described features of the invention suffice for accomplishing the objects thereof. Yet, to achieve a good stability of aberration correction over the entire zooming range with the limitation of the size of the entire lens system to a minimum, it is preferred to satisfy the following various conditions: Letting the focal length of the i-th lens unit be denoted by fi and the shortest focal length of the entire lens system by fw, $$2.99 < f1/fw < 4.08 \quad (1)$$

$$0.88 < |f2/fw| < 1.21 \quad (2)$$

$$1.75 < f3/f4 < 2.42 \quad (3)$$

be satisfied.

Further, to facilitate maintenance of the sufficiently high optical performance despite the size of the zoom lens has been so much minimized, it is preferred to satisfy the following conditions: The fourth lens unit IV has two sub-units or the first sub-unit counting from front of positive refractive power and the second sub-unit of positive refractive power, the aforesaid first sub-unit comprising a first lens of positive refractive power whose front surface has a stronger refractive power than the rear surface has and a bi-concave second lens, and the aforesaid second sub-unit comprising a meniscus-shaped third lens of negative refractive power convex toward the front, a bi-convex fourth lens and a fifth lens of positive refractive power whose front surface has a stronger refractive power than the rear surface has. Letting the radius of curvature of the i-th lens surface counting from front in the fourth lens unit IV be denoted by $R_{IVi}$, the i-th axial lens thickness or air separation counting from front by $D_{IVi}$, and the shortest focal length of the entire lens system by fw $$1.7 < R_{IV2}/R_{IV3} < 2.1 \quad (a)$$

$$2.6 < |R_{IV3}/fw| < 3.4 \quad (b)$$

$$0.02 < D_{IV2}/fw < 0.04 \quad (c)$$

$$0.06 < D_{IV6}/fw < 0.13 \quad (d)$$

$$1.5 < |R_{IV6}/fw| < 1.9 \quad (e)$$

$$0.9 < R_{IV6}/R_{IV9} < 1.3 \quad (f)$$

The technical significance of each of the above-defined inequalities of conditions is explained below.

The inequalities of condition (1) concern with the refractive power of the first lens unit I. When the refractive power of the first lens unit I becomes too strong beyond the lower limit, the longitudinal aberrations on the telephoto side are under-corrected. When it becomes too weak beyond the upper limit, the separation between the first and third lens units I and III becomes too wide compared with the total movement of the second lens unit II. The thus-formed unnecessary space increases the physical length of the lens system objectionably.

The inequalities of condition (2) concern with the refractive power of the second lens unit II. When the refractive power of the second lens unit II becomes too strong beyond the lower limit, the total length of the zoom lens is shortened, but the Petzval sum is increased to the negative direction and the curvature of field is increased. When it is weaker than the upper limit, the variation with zooming of the aberrations is decreased, but the total movement of the second lens unit II must be increased to obtain the prescribed zoom ratio. Thus, the total length of the zoom lens is increased objectionably.

The inequalities of condition (3) concern with the ratio of the refractive power of the third lens unit III to that of the fourth lens unit IV. When the refractive power of the third lens unit III becomes too strong beyond the lower limit, the spherical aberration in the wide angle end tends to be under-corrected. Conversely when the refractive power of the fourth lens unit IV becomes weaker, the total zooming movement of the fourth lens units IV is increased. To avoid mechanical interference, the spacing between the third and fourth lens units III and IV must be widened. Thus, the total length of the zoom lens is increased objectionably. Also, when the ratio of the refractive powers of the third and fourth lens units III and IV becomes too large, the spherical aberration in the wide angle end is over-corrected. Further, large outward coma is produced over the entire zooming range.

The inequalities of condition (a) represent a range of the ratio of the radius of curvature of the rear surface of the first lens to that of the front surface of the second lens, or the refractive power ratio, for well correcting the spherical aberration produced from the rear surface of the first lens by the front surface of the second lens. When the upper limit is exceeded, the spherical aberration is over-corrected. When the lower limit is exceeded, it is under-corrected.

The inequalities of condition (b) represent a range of the refractive power of the front surface of the second lens for well correcting mainly spherical aberration. When the upper limit is exceeded, the spherical aberration is under-corrected. When the lower limit is exceeded, it is over-corrected.

The inequalities of condition (c) represent a range of the air separation between the first and second lenses for correcting mainly spherical aberration and coma in good balance. When the upper limit is exceeded, the spherical aberration is under-corrected. When the lower limit is exceeded, the coma is increased objectionably.

The inequalities of condition (d) represent a range of the air separation between the third and fourth lenses for correcting mainly coma. When the upper limit is exceeded, inward coma is produced. When the lower limit is exceeded, outward coma is produced.

The inequalities of condition (e) represent a range of the negative refractive power of the rear surface of the third lens for making a compromise between the requirements of reducing the size of the entire lens system in such a manner that mainly distortion is well corrected and of securing the back focal length sufficiently. When the upper limit is exceeded, barrel distortion is produced in the wide angle end. When the lower limit is exceeded, large pincushion distortion is produced in the telephoto end, and the sufficient back focal length becomes difficult to secure.

The inequalities of condition (f) represent a range of the ratio of the radius of curvature of the rear surface of the third lens to that of the front surface of the fifth lens for well correcting the pincushion distortion produced by the rear surface of the third lens by the front surface of the fifth lens. When the upper limit is exceeded, barrel distortion is produced in the wide angle end. When the lower limit is exceeded, pincushion distortion is produced in the telephoto end. These aberrations become difficult to correct well.

It is to be noted that, in this embodiment, to make a good compromise between the requirements of reducing the total length of the zoom lens and of reducing the range of variation of the aberrations with zooming, it is recommended that the third lens unit III is formed to a bi-convex singlet and its front and rear surfaces are configured to almost equal radii of curvature to each other with the limitation of their difference to, for example, within ±10%.

In case when the focal length of the entire lens system is chosen at a relatively large value, the ranges of all the conditions (a) to (f) except (c) may be narrowed as follows:

$$1.8 < R_{IV2}/R_{IV3} < 2.1 \quad (a)$$

$$3.0 < |R_{IV3}/fw| < 3.4 \quad (b)$$

$$0.06 < D_{IV6}/fw < 0.09 \quad (d)$$

$$1.6 < |R_{IV6}/fw| < 1.9 \quad (e)$$

$$1.0 < R_{IV6}/R_{IV9} < 1.3 \quad (f)$$

When such conditions are satisfied, an improved image quality can be attained.

Six examples of specific zoom lenses of the invention can be constructed in accordance with the numerical data given in the following tables for the radii of curvature, R, the axial thicknesses or air separations, D, and the refractive indices, N, and Abbe numbers, ν, of the glasses of the lens elements with the subscripts numbered consecutively from front to rear. For note, The last two surfaces R24 and R25 define a face plate, or a filter or other optical member. cl NUMERICAL EXAMPLE 1

| F = 1-2.85 | FNo = 1:1.45 | 2ω = 46.5°-17.2° | |
|---|---|---|---|
| R1 = 6.251 | D1 = 0.13 | N1 = 1.80518 | ν1 = 25.4 |
| R2 = 3.070 | D2 = 0.67 | N2 = 1.51633 | ν2 = 64.1 |
| R3 = −7.813 | D3 = 0.02 | | |
| R4 = 2.606 | D4 = 0.35 | N3 = 1.63854 | ν3 = 55.4 |
| R5 = 11.075 | D5 = Variable | | |
| R6 = −78.187 | D6 = 0.11 | N4 = 1.69680 | ν4 = 55.5 |
| R7 = 1.204 | D7 = 0.29 | | |
| R8 = −1.458 | D8 = 0.09 | N5 = 1.49831 | ν5 = 65.0 |
| R9 = 1.458 | D9 = 0.19 | N6 = 1.84666 | ν6 = 23.9 |
| R10 = 3.870 | D10 = Variable | | |
| R11 = Stop | D11 = 0.25 | | |
| R12 = 4.588 | D12 = 0.19 | N7 = 1.66672 | ν7 = 48.3 |
| R13 = −4.588 | D13 = Variable | | |
| R14 = 1.617 | D14 = 0.31 | N8 = 1.65844 | ν8 = 50.9 |
| R15 = −6.229 | D15 = 0.03 | | |
| R16 = −3.200 | D16 = 0.11 | N9 = 1.75520 | ν9 = 27.5 |
| R17 = 3.200 | D17 = 0.88 | | |
| R18 = 11.662 | D18 = 0.11 | N10 = 1.80518 | ν10 = 25.4 |
| R19 = 1.753 | D19 = 0.07 | | |
| R20 = 3.162 | D20 = 0.31 | N11 = 1.60311 | ν11 = 60.7 |
| R21 = −2.508 | D21 = 0.02 | | |
| R22 = 1.558 | D22 = 0.39 | N12 = 1.71300 | ν12 = 53.8 |
| R23 = −22.475 | D23 = 0.22 | | |
| R24 = ∞ | D24 = 0.59 | N13 = 1.51633 | ν13 = 64.1 |
| R25 = ∞ | | | |

| | Separations with Zooming | | |
|---|---|---|---|
| | | f | |
| D | 1.00 | 1.55 | 2.85 |
| D5 | 0.21 | 0.75 | 1.33 |
| D10 | 1.65 | 1.11 | 0.53 |
| D13 | 0.22 | 0.15 | 0.21 |

NUMERICAL EXAMPLE 2

| F = 1-2.85 | FNo = 1:1.45 | 2ω = 44.8°-16.5° | |
|---|---|---|---|
| R1 = 5.886 | D1 = 0.14 | N1 = 1.80518 | ν1 = 25.4 |
| R2 = 2.656 | D2 = 0.52 | N2 = 1.51633 | ν2 = 64.1 |
| R3 = −8.162 | D3 = 0.02 | | |
| R4 = 2.414 | D4 = 0.33 | N3 = 1.63854 | ν3 = 55.4 |
| R5 = 17.703 | D5 = Variable | | |
| R6 = −17.886 | D6 = 0.10 | N4 = 1.69680 | ν4 = 55.5 |
| R7 = 1.027 | D7 = 0.25 | | |
| R8 = −1.308 | D8 = 0.08 | N5 = 1.49831 | ν5 = 65.0 |
| R9 = 1.335 | D9 = 0.21 | N6 = 1.84666 | ν6 = 23.9 |
| R10 = 4.873 | D10 = Variable | | |
| R11 = Stop | D11 = 0.26 | | |
| R12 = 7.497 | D12 = 0.20 | N7 = 1.65844 | ν7 = 50.9 |
| R13 = −3.191 | D13 = Variable | | |
| R14 = 1.505 | D14 = 0.31 | N8 = 1.65844 | ν8 = 50.9 |
| R15 = −5.828 | D15 = 0.03 | | |
| R16 = −3.033 | D16 = 0.10 | N9 = 1.75520 | ν9 = 27.5 |
| R17 = 3.139 | D17 = 0.94 | | |
| R18 = 9.701 | D18 = 0.10 | N10 = 1.80518 | ν10 = 25.4 |
| R19 = 1.657 | D19 = 0.09 | | |
| R20 = 3.249 | D20 = 0.31 | N11 = 1.60311 | ν11 = 60.7 |
| R21 = −2.520 | D21 = 0.02 | | |
| R22 = 1.495 | D22 = 0.38 | N12 = 1.69680 | ν12 = 55.5 |
| R23 = −12.295 | D23 = 0.21 | | |
| R24 = ∞ | D24 = 0.57 | N13 = 1.51633 | ν13 = 64.1 |
| R25 = ∞ | | | |

| | Separations with Zooming | | |
|---|---|---|---|
| | | f | |
| D | 1.00 | 1.55 | 2.85 |
| D5 | 0.23 | 0.86 | 1.24 |
| D10 | 1.29 | 0.66 | 0.27 |
| D13 | 0.18 | 0.10 | 0.18 |

NUMERICAL EXAMPLE 3

| F = 1-2.85 | FNo = 1:1.45 | 2ω = 49.4°-18.3° | |
|---|---|---|---|
| R1 = 5.724 | D1 = 0.20 | N1 = 1.80518 | ν1 = 25.4 |

-continued

| | | | |
|---|---|---|---|
| R2 = 3.095 | D2 = 0.71 | N2 = 1.51633 | ν2 = 64.1 |
| R3 = −9.210 | D3 = 0.02 | | |
| R4 = 3.013 | D4 = 0.37 | N3 = 1.63854 | ν3 = 55.4 |
| R5 = 11.694 | D5 = Variable | | |
| R6 = 37.832 | D6 = 0.11 | N4 = 1.69680 | ν4 = 55.5 |
| R7 = 1.249 | D7 = 0.34 | | |
| R8 = −1.592 | D8 = 0.09 | N5 = 1.49831 | ν5 = 65.0 |
| R9 = 1.612 | D9 = 0.21 | N6 = 1.84666 | ν6 = 23.9 |
| R10 = 4.836 | D10 = Variable | | |
| R11 = Stop | D11 = 0.28 | | |
| R12 = 12.531 | D12 = 0.18 | N7 = 1.65844 | ν7 = 50.9 |
| R13 = −3.442 | D13 = Variable | | |
| R14 = 1.419 | D14 = 0.32 | N8 = 1.65844 | ν8 = 50.9 |
| R15 = −5.009 | D15 = 0.03 | | |
| R16 = −2.802 | D16 = 0.11 | N9 = 1.75520 | ν9 = 27.5 |
| R17 = 2.602 | D17 = 0.75 | | |
| R18 = 6.791 | D18 = 0.11 | N10 = 1.80518 | ν10 = 25.4 |
| R19 = 1.709 | D19 = 0.12 | | |
| R20 = 4.441 | D20 = 0.32 | N11 = 1.60311 | ν11 = 60.7 |
| R21 = −2.288 | D21 = 0.02 | | |
| R22 = 1.648 | D22 = 0.44 | N12 = 1.69680 | ν12 = 55.5 |
| R23 = −7.174 | D23 = 0.23 | | |
| R24 = ∞ | D24 = 0.63 | N13 = 1.51633 | ν13 = 64.1 |
| R25 = ∞ | | | |

Separations with Zooming

| | f | | |
|---|---|---|---|
| D | 1.00 | 1.81 | 2.85 |
| D5 | 0.18 | 0.96 | 1.44 |
| D10 | 1.57 | 0.79 | 0.31 |
| D13 | 0.23 | 0.16 | 0.23 |

NUMERICAL EXAMPLE 4

F = 1-2.85  FNo = 1:1.45  2ω = 46.5°-17.2°

| | | | |
|---|---|---|---|
| R1 = 6.150 | D1 = 0.13 | N1 = 1.80518 | ν1 = 25.4 |
| R2 = 3.078 | D2 = 0.67 | N2 = 1.51633 | ν2 = 64.1 |
| R3 = −7.909 | D3 = 0.02 | | |
| R4 = 2.611 | D4 = 0.35 | N3 = 1.63854 | ν3 = 55.4 |
| R5 = 10.892 | D5 = Variable | | |
| R6 = −51.618 | D6 = 0.11 | N4 = 1.69350 | ν4 = 53.2 |
| R7 = 1.194 | D7 = 0.29 | | |
| R8 = −1.456 | D8 = 0.09 | N5 = 1.49831 | ν5 = 65.0 |
| R9 = 1.456 | D9 = 0.19 | N6 = 1.84666 | ν6 = 23.9 |
| R10 = 3.979 | D10 = Variable | | |
| R11 = Stop | D11 = 0.25 | | |
| R12 = 4.572 | D12 = 0.19 | N7 = 1.66672 | ν7 = 48.3 |
| R13 = −4.572 | D13 = Variable | | |
| R14 = 1.615 | D14 = 0.31 | N8 = 1.65844 | ν8 = 50.9 |
| R15 = −6.197 | D15 = 0.03 | | |
| R16 = −3.194 | D16 = 0.11 | N9 = 1.75520 | ν9 = 27.5 |
| R17 = 3.194 | D17 = 0.88 | | |
| R18 = 11.948 | D18 = 0.11 | N10 = 1.80518 | ν10 = 25.4 |
| R19 = 1.751 | D19 = 0.07 | | |
| R20 = 3.142 | D20 = 0.31 | N11 = 1.60311 | ν11 = 60.7 |
| R21 = −2.509 | D21 = 0.02 | | |
| R22 = 1.553 | D22 = 0.38 | N12 = 1.71300 | ν12 = 53.8 |
| R23 = −22.722 | D23 = 0.22 | | |
| R24 = ∞ | D24 = 0.59 | N13 = 1.51633 | ν13 = 64.1 |
| R25 = ∞ | | | | b.f. = 1.25 (This value is obtained by reducing the parallel plate to air).

Separations with Zooming

| | f | | |
|---|---|---|---|
| D | 1.00 | 1.55 | 2.85 |
| D5 | 0.21 | 0.75 | 1.33 |
| D10 | 1.64 | 1.11 | 0.53 |
| D13 | 0.22 | 0.15 | 0.21 |

NUMERICAL EXAMPLE 5

F = 1-2.85  FNo = 1:1.45  2ω = 46.5°-17.2°

| | | | |
|---|---|---|---|
| R1 = 6.198 | D1 = 0.13 | N1 = 1.80518 | ν1 = 25.4 |
| R2 = 3.070 | D2 = 0.67 | N2 = 1.51633 | ν2 = 64.1 |
| R3 = −7.761 | D3 = 0.02 | | |
| R4 = 2.605 | D4 = 0.35 | N3 = 1.63854 | ν3 = 55.4 |
| R5 = 10.761 | D5 = Variable | | |
| R6 = −73.838 | D6 = 0.11 | N4 = 1.69680 | ν4 = 55.5 |
| R7 = 1.204 | D7 = 0.29 | | |
| R8 = −1.457 | D8 = 0.09 | N5 = 1.49831 | ν5 = 65.0 |
| R9 = 1.457 | D9 = 0.19 | N6 = 1.84666 | ν6 = 23.9 |
| R10 = 3.882 | D10 = Variable | | |
| R11 = Stop | D11 = 0.25 | | |
| R12 = 4.570 | D12 = 0.19 | N7 = 1.65844 | ν7 = 50.9 |
| R13 = −4.570 | D13 = Variable | | |
| R14 = 1.614 | D14 = 0.31 | N8 = 1.65844 | ν8 = 50.9 |
| R15 = −6.200 | D15 = 0.03 | | |
| R16 = −3.197 | D16 = 0.11 | N9 = 1.75520 | ν9 = 27.5 |
| R17 = 3.197 | D17 = 0.88 | | |
| R18 = 10.912 | D18 = 0.11 | N10 = 1.80518 | ν10 = 25.4 |
| R19 = 1.750 | D19 = 0.07 | | |
| R20 = 3.196 | D20 = 0.31 | N11 = 1.60311 | ν11 = 60.7 |
| R21 = −2.529 | D21 = 0.02 | | |
| R22 = 1.553 | D22 = 0.39 | N12 = 1.71300 | ν12 = 53.8 |
| R23 = −23.091 | D23 = 0.22 | | |
| R24 = ∞ | D24 = 0.59 | N13 = 1.51633 | ν13 = 64.1 |
| R25 = ∞ | | | | b.f. = 1.25 (obtained by reducing the parallel plate to air).

Separations with Zooming

| | f | | |
|---|---|---|---|
| D | 1.00 | 1.56 | 2.85 |
| D5 | 0.21 | 0.75 | 1.33 |
| D10 | 1.65 | 1.11 | 0.53 |
| D13 | 0.22 | 0.15 | 0.21 |

NUMERICAL EXAMPLE 6

F = 1-2.85  FNo = 1:1.45  2ω = 46.5°-17.2°

| | | | |
|---|---|---|---|
| R1 = 6.231 | D1 = 0.13 | N1 = 1.80518 | ν1 = 25.4 |
| R2 = 3.122 | D2 = 0.66 | N2 = 1.51633 | ν2 = 64.1 |
| R3 = −7.737 | D3 = 0.02 | | |
| R4 = 2.603 | D4 = 0.37 | N3 = 1.63854 | ν3 = 55.4 |
| R5 = 10.494 | D5 = Variable | | |
| R6 = −124.354 | D6 = 0.11 | N4 = 1.69680 | ν4 = 55.5 |
| R7 = 1.204 | D7 = 0.29 | | |
| R8 = −1.466 | D8 = 0.09 | N5 = 1.49831 | ν5 = 65.0 |
| R9 = 1.466 | D9 = 0.19 | N6 = 1.84666 | ν6 = 23.9 |
| R10 = 3.813 | D10 = Variable | | |
| R11 = Stop | D11 = 0.25 | | |
| R12 = 4.762 | D12 = 0.19 | N7 = 1.65844 | ν7 = 50.9 |
| R13 = −4.762 | D13 = Variable | | |
| R14 = 1.642 | D14 = 0.31 | N8 = 1.65844 | ν8 = 50.9 |
| R15 = −6.369 | D15 = 0.03 | | |
| R16 = −3.206 | D16 = 0.11 | N9 = 1.75520 | ν9 = 27.5 |
| R17 = 3.206 | D17 = 0.94 | | |
| R18 = 11.269 | D18 = 0.11 | N10 = 1.80518 | ν10 = 25.4 |
| R19 = 1.829 | D19 = 0.08 | | |
| R20 = 3.543 | D20 = 0.31 | N11 = 1.62299 | ν11 = 58.2 |
| R21 = −2.567 | D21 = 0.02 | | |
| R22 = 1.559 | D22 = 0.39 | N12 = 1.71300 | ν12 = 53.8 |
| R23 = −24.059 | D23 = 0.22 | | |
| R24 = ∞ | D24 = 0.59 | N13 = 1.51633 | ν13 = 64.1 |
| R25 = ∞ | | | | b.f. = 1.31 (obtained by reducing the parallel plate to air).

Separations with Zooming

| | f | | |
|---|---|---|---|
| D | 1.00 | 1.55 | 2.85 |
| D5 | 0.20 | 0.74 | 1.32 |
| D10 | 1.65 | 1.11 | 0.53 |
| D13 | 0.22 | 0.15 | 0.21 |

The Values of the Factors in All the Inequalities of
Conditions for the Numerical Examples 1 to 6

| Factor | Numerical Examples | | | | | |
|---|---|---|---|---|---|---|
| | 1 | 2 | 3 | 4 | 5 | 6 |
| $f_1/fw$ | 3.49 | 3.15 | 3.88 | 3.49 | 3.49 | 3.49 |
| $\|f_2/fw\|$ | 1.02 | 0.93 | 1.15 | 1.02 | 1.02 | 1.02 |
| $f_3/f_4$ | 1.85 | 1.87 | 2.30 | 1.84 | 1.87 | 1.94 |
| $R_{IV2}/R_{IV3}$ | 1.95 | 1.92 | 1.79 | 1.94 | 1.94 | 1.99 |
| $\|R_{IV3}/fw\|$ | 3.20 | 3.03 | 2.80 | 3.19 | 3.20 | 3.21 |
| $D_{IV2}/fw$ | 0.03 | 0.03 | 0.03 | 0.03 | 0.03 | 0.03 |
| $D_{IV6}/fw$ | 0.07 | 0.09 | 0.12 | 0.07 | 0.07 | 0.08 |
| $\|R_{IV6}/fw\|$ | 1.75 | 1.66 | 1.71 | 1.75 | 1.75 | 1.83 |
| $R_{IV6}/R_{IV9}$ | 1.13 | 1.11 | 1.04 | 1.13 | 1.13 | 1.17 |

According to the invention, of the four lens units, for the zooming purpose, the second and fourth ones are made to move in such a way as has been described above. Further, the form and construction and arrangements of the lens elements of the fourth unit are specified as has been described above, and the stop is arranged between the second and third units. By employing such a lens design, the lens system can be shortened not only in the longitudinal but in the lateral direction. Thus, a compact high-performance zoom lens has been realized.

What is claimed is:

1. A compact zoom lens comprising:
    from front to rear,
    a first lens unit having a positive refractive power and axially movable for focusing;
    a second lens unit having a negative refractive power and monotonously, axially movable for zooming;
    a stop fixed relative to an optical axis;
    a third lens unit stationary relative to the optical axis and having a positive refractive power; and
    a fourth lens unit to move, while depicting a locus convex toward the front, to compensate for the shift of an image plane resulting from the movement of said second lens unit,
    wherein letting the focal length of the i-th lens unit counting from the front be denoted by fi and the shortest focal length of the entire lens system by fw, the following conditions are satisfied:

$$2.99 < f_1/fw < 4.08$$

$$0.88 < |f_2/fw| < 1.21$$

$$1.75 < f_3/f_4 < 2.42.$$

2. A compact zoom lens according to claim 1, wherein said fourth lens unit has a first sub-unit counting from front comprising a first lens having a positive refractive power and whose front surface has a stronger refractive power than its rear surface has, and a bi-convex second lens, and a second sub-unit comprising a meniscus-shaped third lens of negative refractive power convex toward the front, a bi-convex fourth lens, and a fifth lens of positive refractive power whose front surface has a stronger refractive power than its rear surface has, said fourth lens unit saitsfying the following conditions where the radius of curvature of the i-th lens surface counting from the front in said fourth lens unit is denoted by $R_{IVi}$ and the i-th lens thickness or air separation is denoted by $D_{IVi}$:

$$1.7 < R_{IV2}/R_{IV3} < 2.1$$

$$2.6 < |R_{IV3}/fw| < 3.4$$

$$0.02 < D_{IV2}/fw < 0.04$$

$$0.06 < D_{IV6}/fw < 0.13$$

$$1.5 < |R_{IV6}/fw| < 1.9$$

$$0.9 < R_{IV6}/R_{IV9} < 1.3.$$

* * * * *

UNITED STATES PATENT AND TRADEMARK OFFICE
CERTIFICATE OF CORRECTION

PATENT NO. : 4,802,747
DATED : February 7, 1989
INVENTOR(S) : AKIHISA HORIUCHI

It is certified that error appears in the above-identified patent and that said Letters Patent is hereby corrected as shown below:

Cover Page,

[30], "61-26539" should read --61-226539--;

Column 1, line 39, "for" should read --if--;
line 61, "for" should read --if--;
line 63, "to" should read --in--.

Column 3, line 6, "at decreasing" should read --to decrease--.

Column 5, line 65, "The" should read --the--;
lines 67-68, "cl NUMERICAL EXAMPLE 1" should be deleted.

COLUMN 6 line 1, insert the heading --NUMERICAL EXAMPLE 1 --.

UNITED STATES PATENT AND TRADEMARK OFFICE
CERTIFICATE OF CORRECTION

PATENT NO. : 4,802,747
DATED : February 7, 1989
INVENTOR(S) : AKIHISA HORIUCHI

Page 2 of 2

It is certified that error appears in the above-identified patent and that said Letters Patent is hereby corrected as shown below:

Column 6, line 59, " $\dfrac{f}{D \quad 1.00 \quad 1.55 \quad 2.85}$ "

should read

-- $\dfrac{f}{D \quad 1.00 \quad 1.81 \quad 2.85}$ --

Signed and Sealed this

Tenth Day of October, 1989

Attest:

DONALD J. QUIGG

Attesting Officer

Commissioner of Patents and Trademarks